(12) United States Patent
Takasaka et al.

(10) Patent No.: US 8,417,835 B2
(45) Date of Patent: Apr. 9, 2013

(54) INFORMATION PROCESSING APPARATUS, AND INFORMATION PROCESSING METHOD

(75) Inventors: Michiaki Takasaka, Kawasaki (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 12/754,481

(22) Filed: Apr. 5, 2010

(65) Prior Publication Data

US 2010/0262719 A1    Oct. 14, 2010

(30) Foreign Application Priority Data

Apr. 8, 2009  (JP) ................. 2009-094099

(51) Int. Cl.
  *G06F 3/00*   (2006.01)
  *G06F 13/28*  (2006.01)
  *G06F 13/00*  (2006.01)
  *G06F 13/40*  (2006.01)

(52) U.S. Cl.
  USPC ............... 710/3; 710/1; 710/2; 710/4; 710/5; 710/28; 710/32; 710/36; 710/44; 710/55; 710/100; 710/307

(58) Field of Classification Search .......... 710/1–5, 710/28, 32, 36, 44, 55, 100, 307
  See application file for complete search history.

(56) References Cited

U.S. PATENT DOCUMENTS

| | | | | |
|---|---|---|---|---|
| 4,821,174 A | * | 4/1989 | Webb et al. ............ | 710/107 |
| 5,388,223 A | * | 2/1995 | Guthrie et al. .......... | 370/448 |
| 5,699,460 A | * | 12/1997 | Kopet et al. ............ | 382/307 |
| 6,058,449 A | * | 5/2000 | Linzmeier et al. ....... | 710/107 |
| 6,101,564 A | * | 8/2000 | Athenes et al. .......... | 710/107 |
| 7,117,278 B2 | * | 10/2006 | Avery ..................... | 710/62 |
| 7,899,000 B2 | * | 3/2011 | Sukegawa et al. ....... | 370/315 |
| 2002/0040426 A1 | * | 4/2002 | Kamitani et al. ........ | 712/25 |
| 2006/0271993 A1 | * | 11/2006 | Nakata et al. ........... | 725/131 |
| 2008/0109353 A1 | * | 5/2008 | Kuriya ................... | 705/40 |
| 2008/0168003 A1 | * | 7/2008 | Wald ...................... | 705/36 R |
| 2009/0265498 A1 | * | 10/2009 | Yamaoka ................ | 710/305 |

FOREIGN PATENT DOCUMENTS

JP    64-023340 A    1/1989

* cited by examiner

*Primary Examiner* — Idriss N Alrobaye
*Assistant Examiner* — Getente A Yimer
(74) *Attorney, Agent, or Firm* — Canon U.S.A., Inc. IP Division

(57) ABSTRACT

There is provided an apparatus including a plurality of modules. Each module includes a storage unit configured to store a waiting ID and a specific ID of the module, a communication unit configured to transmit and receive packets to and from a bus, and a processing unit configured to process data of a packet which includes a valid flag indicating that the packet is valid, wherein the communication unit takes in data held by a packet which has an ID that coincides with the waiting ID, and stores the processed data in a packet which includes the valid flag indicating invalid and an ID coincident with the specific ID, and transmits the packet.

18 Claims, 11 Drawing Sheets

FIG.2
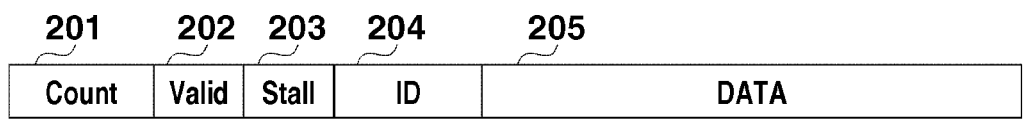
DATA PACKET
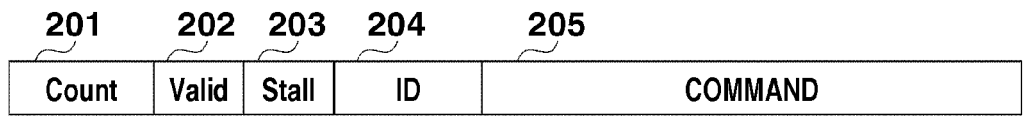
COMMAND PACKET

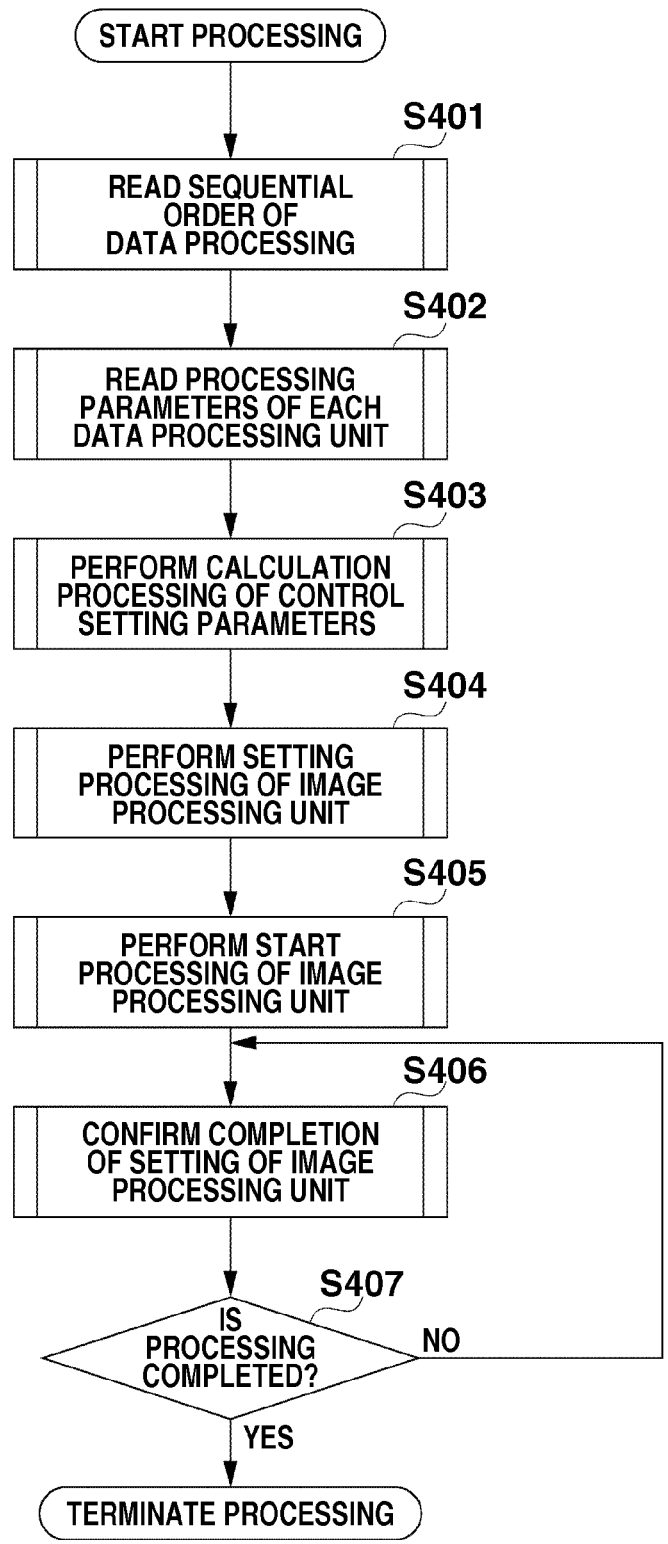

FIG.10

| UNIFIED ID OF PACKET | MODULE-SPECIFIC ID |
|---|---|
| 1 | 3 |
| 5 | 1 |
| ⋮ | ⋮ |

INFORMATION PROCESSING APPARATUS, AND INFORMATION PROCESSING METHOD

BACKGROUND OF THE INVENTION

1. Field of the Invention

The present invention relates to an information processing apparatus in which a plurality of processing units that perform data processing is connected by a ring bus, and a control method therefor.

2. Description of the Related Art

A token ring network (TRN) type data driving mode processing system is known, which has adopted a concept of a Token Ring Network (TRN) as one type of a ring-shaped communication network and includes a plurality of processing units (Japanese Patent Application Open-Laid No. 64-23340).

In this system, a processing unit which intends to transmit data firstly acquires a packet referred to as a free token which circulates around a bus. Then, the processing unit, which has acquired the free token, copies a destination identifier and processing data on the token, and forwards the token to the bus to transmit the token to a destination module On the other hand, a processing unit at a reception side, when a token of which destination is own-unit is received, copies processing data and sets a reception completion flag indicating that reception has been completed to the received token, and then launches again the received token to the ring bus. A transmission source node, if a token in which the above-described reception completion flag is not set has returned, sends again the same token. If a token in which the reception completion flag is set has returned, the transmission source node clears the flag attached to the token.

Through the above-described processing, there is realized a communication system in which, when there is one token, for example, one processing unit uses exclusively the ring bus at one time. Such a communication system is referred to as a token-passing-ring system.

However, in an information processing system in which a plurality of modules that perform data processing is connected by a ring bus, if the token passing system is applied thereto, the token must be sent back to a transmission source regardless of success or failure in reception. In other words, even if the reception has been successful, other processing units cannot use the token in the middle of returning from a processing unit that has received the token to a processing unit that has transmitted the token, and as a result, it is not efficient.

Further, in a system in which a plurality of processing units is connected to the ring bus, it is important not to stagnate packets flowing around the ring bus. This is because, once a stream of data flowing around the ring bus is stopped, a processable processing unit is forcibly shifted to a waiting state.

SUMMARY OF THE INVENTION

According to an aspect of the present invention, there is provided an apparatus including a plurality of modules. Each module includes a storage unit configured to store a waiting ID and a specific ID of the module, a communication unit configured to transmit and receive packets to and from a bus, and a processing unit configured to process data of a packet which includes a valid flag indicating that the packet is valid, wherein the communication unit takes in data held by a packet which has an ID that coincides with the waiting ID, and stores the processed data in a packet which includes the valid flag indicating invalid and an ID coincident with the specific ID, and transmits the packet.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates formats of packets.

FIG. 4 illustrates initial setting processing of the processing apparatus.

FIG. 10 is a table that stores a corresponding relationship between unified IDs and specific IDs.

DESCRIPTION OF THE EMBODIMENTS

Various exemplary embodiments, features, and aspects of the invention will be described in detail below with reference to the drawings.

Figure 1:
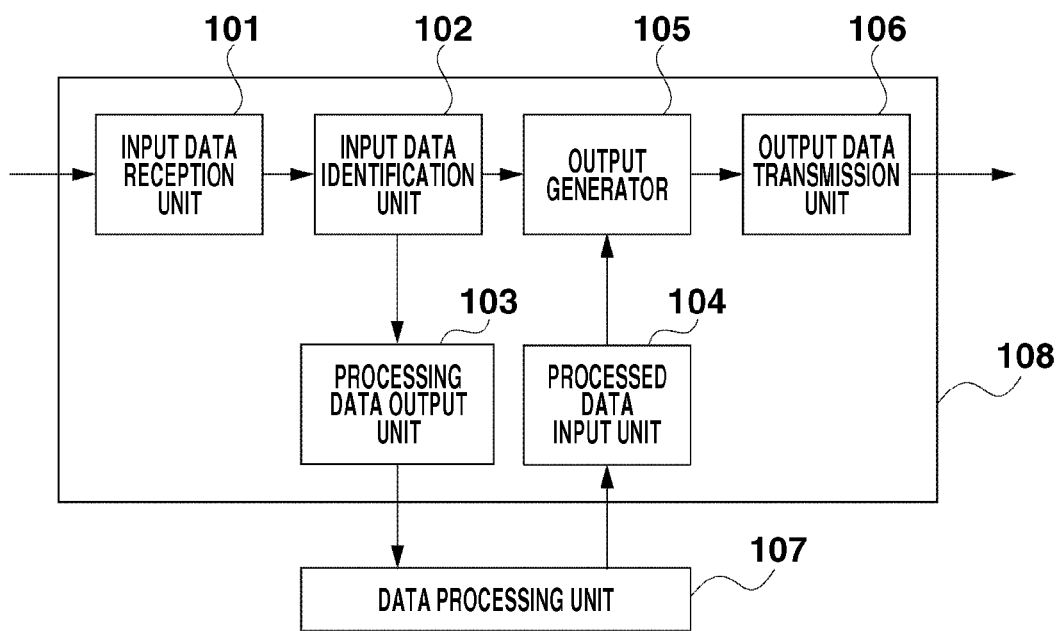
FIG. 1 illustrates a schematic configuration of a communication processing unit.

First, an example when a processing speed is reduced in an information processing apparatus in which a plurality of information processing units is connected by a ring bus will be described below. FIG. 1 illustrates a configuration of a communication processing unit 108 that connects a communication path (bus) and an information processing unit (hereinafter, data processing unit), and a data processing unit 107 is connected to the communication processing unit 108. An input data reception unit 101 receives a data packet flowing on the ring bus. An input data identification unit 102 checks for control information of the data packet that is input thereto, and identifies whether the input data is data to be processed in its own node. If it is determined as the data to be processed in its own node, data extracted from the packet is transmitted to a processing data output unit 103, and a valid bit of the packet from which the data is extracted is changed to turn into an empty packet.

The processing data output unit 103 transmits to the data processing unit 107 the data determined as data to be processed in its own node by the input data identification unit 102. The processed data input unit 104 receives input of processed data in the data processing unit of its own node.

An output generator 105, when it does not store data to be output, outputs a packet from the input data identification unit 102 as it is. When the output generator 105 has data which is processed and transmitted from the processed data input unit 104, and to be output to the bus, the output generator 105 generates a packet for output upon receiving an empty packet. An output data transmission unit 106 releases output data which is generated by the output generator 105 to the ring bus.

As described above, a plurality of processing modules connected in the ring shape transfers the data in a predetermined one direction on the ring.

FIG. 2 illustrates data structure (format) of packets used for transmission and reception of data in the data communication processing unit as illustrated in FIG. 1.

A field 201 includes a count value (count) indicating processing sequence of data. In the ring bus, a portion of a plurality of data packets having an anteroposterior relationship in the processing sequence may sometimes circulate additionally around the ring. Therefore, even if the communication processing unit receives a packet of which destination is own-unit, it does not necessarily store data to be firstly processed by corresponding data processing unit. Hence, processing can be executed in accordance with correct processing sequence, such as in order of input, by storing data with such a count value. A corresponding data processing unit refers to a data processing unit with which a communication processing unit can directly communicate without via the ring bus. In an example in FIG. 1, the data processing unit is connected with the communication processing unit in a one-to-one relationship and can bidirectionally communicate therewith.

A field 202 includes a flag indicating that data stored by the data packet is valid data. In other words, the flag has the same meaning as a flag indicating whether the packet is being used. Hereinbelow, the flag is referred to as a valid bit (valid flag). A field 203 includes a flag indicating that data stored by the packet has not been processed by the data processing unit that is to perform processing next. This flag can be handled in a similar manner to a request signal for stopping data supply (disable signal) to a preceding stage in a normal linear type pipeline processing circuitry. Hereinbelow, the flag is referred to as a stall bit.

A field 204 includes an ID of the data processing unit that has processed the data at the end. In data communication processing unit, the field 204 stores a waiting ID externally set in advance. The input data identification unit 102 described above compares the waiting ID with an ID on the data packet, and when these IDs coincide with each other, captures the packet into the processing data output unit 103 to perform processing. A field 205 stores data or command. FIG. 2 illustrates a data packet and a command packet, but both data and command may be mixed and stored in the field 205.

Normally, before IDs are compared with each other, it is checked if a valid bit is set to a value indicating that the packet is valid, and the communication processing unit causes the data processing unit to process a packet which has coincident IDs for valid packet. On the other hand, the communication processing unit, if data that the data processing unit has processed is stored in the packet, checks if a valid bit is set to a value indicating that the packet is invalid, and stores the data in an invalid packet (empty packet). For example, a valid bit indicates valid when it is set to "1", and indicates invalid when it is set to "0" (reverse setting is acceptable).

Conceptually, a total number of packets flowing around the ring bus is substantially constant. In other words, a sum of empty packets and valid packets is substantially constant, and the constant number of packets continues to circulate around the ring bus. In this process, an empty packet is a packet in which data to be stored is determined as invalid, and a valid packet is a packet that stores data and a command to be processed.

Figure 3A:
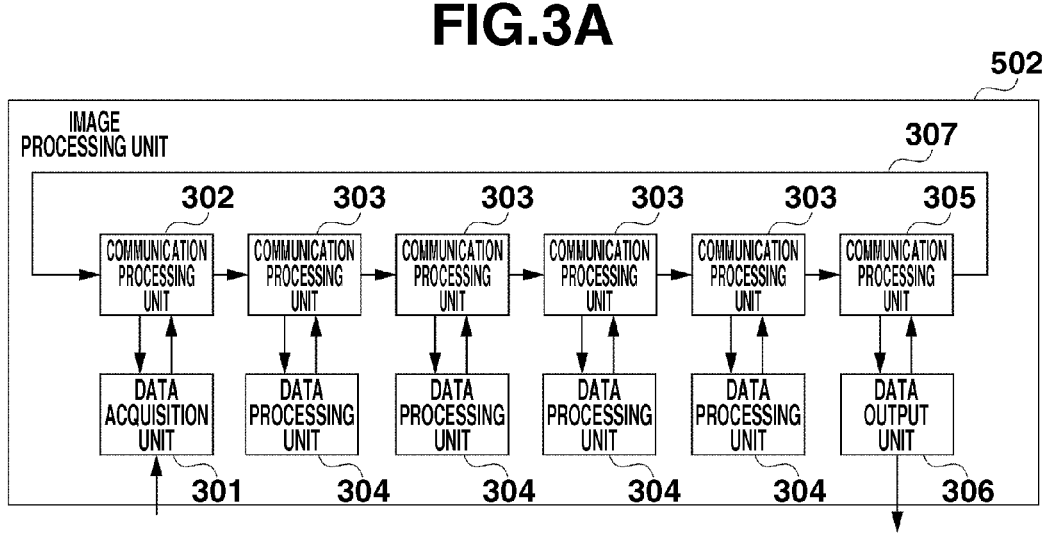
FIGS. 3A and 3B illustrate a processing apparatus in which a plurality of data processing units is connected by a ring bus.

FIG. 3A illustrates an example of a configuration of an image processing unit that adopts the ring bus.

A data acquisition unit 301 acquires data to be processed from an external storage apparatus or the like. A communication processing unit 302 performs processing for supplying the acquired data to the ring bus. A data processing unit 304 performs a predetermined processing on the supplied data. Normally, since a processing unit for performing information processing does not take a stand-alone state in which the processing unit does not communicate with the outside thereof, the processing unit has somewhat communication function, and a communication function portion may not be physically independent. However, in the present specification, in order to describe in detail communication processing of the processing unit, description is given by separating the data processing unit and the communication processing unit from the processing unit.

A communication processing unit 303 selects and captures data to be processed in the data processing unit 304 from a communication path, namely a ring bus 307. (In this processing, the communication processing unit 303 passes through data which is not captured thereby.) In this configuration, one or more processing units including the data processing unit 304 and the communication processing unit 303 are connected to the ring bus 307.

An output communication processing unit 305 selects and captures processed data from the ring bus, in order to output data on which all kinds of predetermined processing have been completed to an external storage apparatus or the like (or passes through other pieces of data). A data output unit 306 outputs the data that the communication processing unit 305 has captured to the external storage apparatus or a random-access memory (RAM). The ring bus 307 is a ring-shaped communication path that communicatably interconnects these communication processing units. If the communication processing units are interconnected to one another in a ring shape, the communication processing units are a part of the ring-shaped communication path, and can be also regarded as a part of the ring bus. Most data stored in respective communication processing units 302, 303, and 305 are shifted to a next communication processing unit for each of predetermined clocks.

Figure 3B:
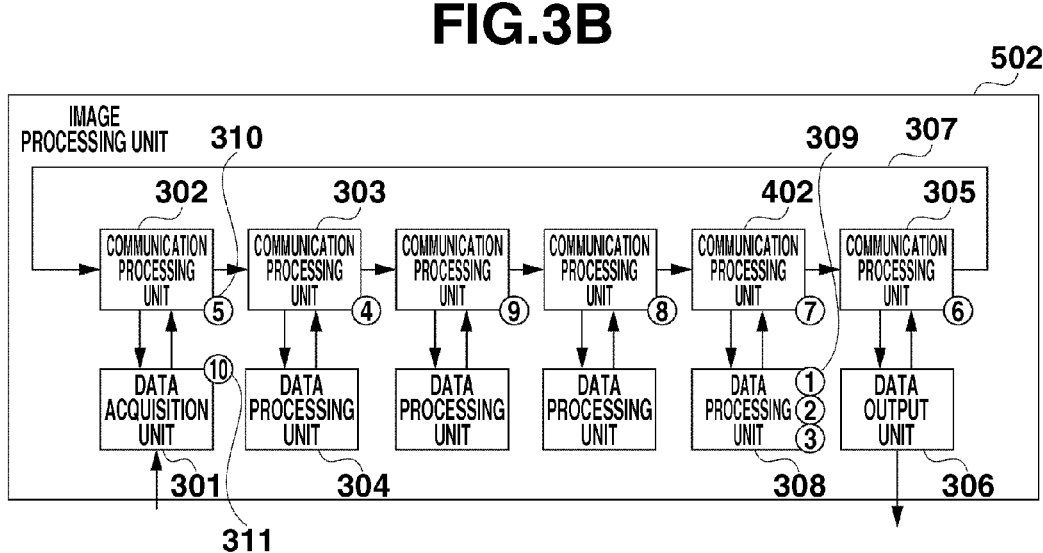

FIG. 3B illustrates a state in which deadlock develops, in a configuration illustrated in FIG. 3A. In FIG. 3B, in order to indicate a sequential order of data, numbers indicating an input order of data are assigned in data 309 to 311.

A data processing unit 308 is a data processing unit for processing and outputting three pieces of data at one cycle time. (For example, processing for outputting an average value of three pixels). From when the data processing unit 308 acquires three pieces of data until it completes the processing, a communication processing unit 402 that one-to-one communicates with the data processing unit 308 cannot output a processing result.

In this processing, if the data acquisition unit 301 continues to supply data while the data processing unit 308 is processing, all of packets circulating around the ring bus may be occupied with data supplied from the data acquisition unit 301. In this case, since no empty packets remain, and data 309 output from the data processing unit 308 cannot be output to the ring bus 307 and is stagnated.

Further, the data processing unit 308 is assumed to be unable to shift to a next data processing until all pieces of data that the unit itself has processed are output. In this case, the data processing unit 308 cannot acquire next data since it cannot output processed data. On the other hand, the data acquisition unit 301 is also stopped, since the communication processing unit 302 cannot output the data to the ring bus 307.

Further, the data output unit 306 cannot output any data to the outside, since processed data 309 to be output is not output from the data processing unit 308.

In this way, in the data processing apparatus in which a plurality of the processing units is connected to the ring bus, all packets on the ring bus may be occupied by unprocessed data. Accordingly, the data processing unit becomes unable to acquire next data, and falls into a deadlock state in which it cannot continue processing.

Next, one exemplary embodiment of the present invention will be described below. For components similar to those in the above-described examples on configuration and function, descriptions thereof will be omitted.

Figure 5:
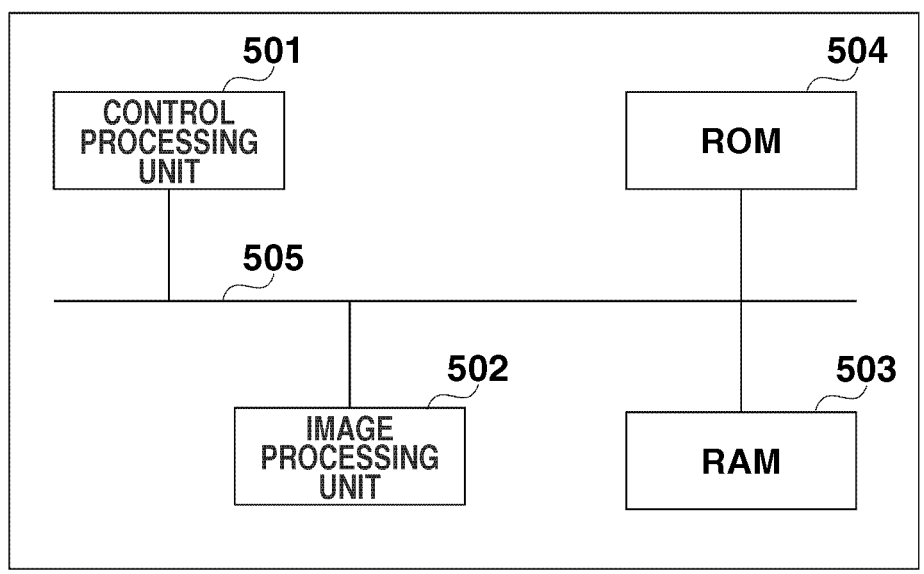
FIG. 5 illustrates a schematic configuration of an image processing apparatus.

FIG. 5 illustrates a schematic configuration of a system according to the present exemplary embodiment. A control processing unit 501 is a processing circuit such as a central processing unit (CPU), a micro processing unit (MPU) or the like. An image processing unit 502 includes a plurality of processing units (modules) that are connected by a ring bus.

A random-access memory (RAM) 503 is a readable-writable memory, and stores input image data before processing, output image data after processing, or data regarding setting parameters of the image processing unit 502. A read-only memory (ROM) 504 is a memory that can store and read out processing procedures of the control processing unit 501 and the image processing unit 502, variables and fixed values such as setting parameters, or the like.

The control processing unit 501 performs control of the system and instructions to the image processing unit 502 in accordance with a program read out from the ROM 504. The image processing unit 502 executes image processing in accordance with an instruction from the control processing apparatus 501. In this occasion, the control processing unit 501 reads out input image data stored in the RAM 503 in advance to perform processing, and writes processing result again into the RAM 503. A system bus 505 connects communicatably the control processing unit 501, the image processing unit 502, the RAM 503, and the ROM 504.

FIG. 4 illustrates a procedure of setting processing of the image processing unit 502 by the control processing unit 501.

When an image processing control is started, the control processing unit 501 executes the processing in accordance with the following steps. In step S401, the control processing unit 501 reads out a sequential order of data processing by each data processing unit of the image processing unit 502 from the ROM 504. In step S402, the control processing unit 501 reads out processing parameters to be provided from the ROM 504 to each data processing unit. In step S403, the control processing unit 501 performs calculation of control parameters of the image processing unit 502 using the read out sequential order of data processing and processing parameters.

In step S404, the control processing unit 501 performs setting processing of the image processing unit 502 using the control parameters calculated in step S403. In step S405, the control processing unit 501 issues an instruction to start processing to the image processing unit 502. In step S406, the control processing unit 501 confirms completion of setting of the image processing unit 502. In step S407, if the control processing unit 501 determines that setting processing is completed (YES in step S407), then terminates the processing. In this process, if the processing is not completed (NO in step S407), the processing returns again to step S406, and the control processing unit 501 continues to confirm the processing.

Figure 7:
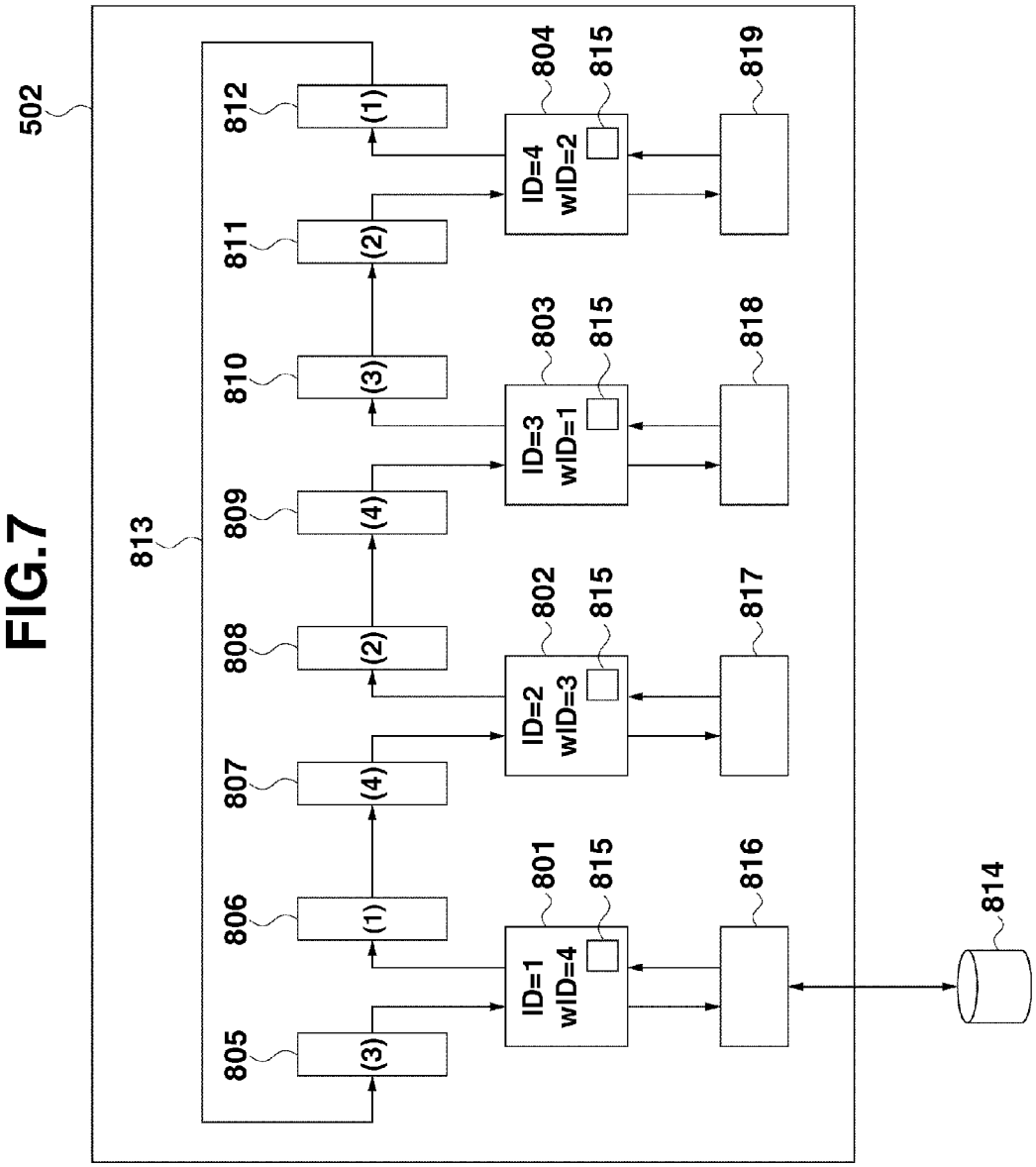
FIG. 7 illustrates mapping processing.

Next, the image processing unit 502 according to the present exemplary embodiment will be described below. FIG. 7 is a block diagram illustrating a configuration of the image processing unit 502 in which four modules are connected to the ring bus. The data processing units and registers over the ring bus are emphasized in order to describe mapping processing (details will be described below).

The image processing unit 502 includes communication processing units 801 to 804, data processing units 816 to 819, registers 805 to 812, and a ring bus 813. Further, the image processing unit 502 is configured to enable inputting data from the outside of the image processing unit 502 via an input-output buffer 814, or to enable outputting data to the outside thereof.

Each of the communication processing units 801 to 804 includes the register 815 that stores information (hereinafter, a waiting ID and a specific ID) for identifying data that each unit processes by itself. In the present exemplary embodiment, a packet to be processed is identified by discriminating coincidence between the waiting ID set in the registers of the data processing units 801 to 804, and an ID of a received packet.

In the present exemplary embodiment, in order to simplify descriptions, each data processing unit is assumed to process one piece of data (1 pixel) that is input, and outputs one piece of data (1 pixel). A total number of the packets that circulate around the ring bus are assumed to be eight, which is equal to a total number of the registers.

Setting of the waiting ID of each data processing unit and mapping of a packet are performed by the control processing unit 501. First, an ID specific to each data processing unit (specific ID) is allocated to each of the registers 815. In the present exemplary embodiment, the data processing unit which has stored a specific ID of (1) manages input and output of data from and to the outside of processing circuit. Further, a specific ID of each data processing unit may be set to a prefixed value. In the present exemplary embodiment, it is set that the communication processing unit 801 has the specific ID of (1), the data processing unit 802 has the specific ID of (2), the data processing unit 803 has the specific ID of (3), and the data processing unit 804 has the specific ID of (4).

Next, the control processing unit 501 sets a waiting ID (wID in FIG. 7) of each data processing unit. In the present exemplary embodiment, it is set that the communication processing unit 801 has the wID of (4), the data processing unit 802 has the wID of (3), the data processing unit 803 has the wID of (1), and the data processing unit 804 has the wID of (2).

Each data processing unit is configured to capture a packet having an ID that coincides with the waiting ID (other packets are passed through), and output a packet which has a specific ID with adding the data processed by own-unit to the ring bus. Therefore, when the specific ID and the waiting ID are set for each data processing unit, data flow will be virtually formed by a plurality of the processing units. When IDs and wIDs are set as illustrated in FIG. 7, data which is input from the buffer 814 is subjected to pipeline processing in sequential order of (from the communication processing unit 801), the data processing unit 803, the data processing unit 802, and the data processing unit 804, and then processing results are output to the buffer 814.

Next, the control processing unit 501 performs mapping of eight empty packets to each register. In this occasion, valid bits of eight empty packets are value (0) indicating invalid, and further, each empty packet stores IDs as illustrated in FIG. 7. In the register 805, a packet that stores the ID of 3 is mapped. Similarly, in the registers 806, 807, 808, 809, 810, 811, and 812, the packets with IDs of 1, 4, 2, 4, 3, 2, and 1 are mapped in this order, respectively.

In the present exemplary embodiment, there are four data processing units, and at least all four types of IDs need to be mapped in at least one packet. However, when a processing unit that is not used for data processing is apparent, any empty packet having an ID thereof needs not be mapped.

Further, a necessary interval between empty packets having the same ID is assumed to be an arrangement interval. In the present exemplary embodiment, the arrangement interval is assumed to be (1), empty packets that have the same ID are mapped such that they are not adjacent with each other. If the arrangement interval is (2), empty packets that have the same ID appears at an interval of every three or more packets.

FIG. 1 illustrates a configuration of the communication processing unit 108 that connects the ring bus and the data processing unit.

The output generator 105 generates output data by storing data transmitted from the processed data input unit 104 in an empty packet.

When the input data identification unit 102 changes a valid bit of a source packet from which data has been extracted to invalid (0), an ID of the packet from which data has been extracted or the data is cleared, if the previously described system is used. In the present exemplary embodiment, however, even for a packet from which data has been extracted, the input data identification unit 102 does not clear the ID thereof.

Then, the output generator 105, when storing data in a packet, confirms a valid bit thereof and checks whether it is an empty packet, further, checks whether an ID added to the empty packet coincides with a specific ID. In other words, the output generator 105 stores processed data only in a packet that is empty and whose ID coincides with the specific ID.

The input data identification unit 102 has the registers for storing waiting IDs, and the output generator 105 has the registers for storing specific IDs. In the above-described step S404, the control processing unit 501 sets values for these registers. Further, the processed data input unit 104, when receiving data from the data processing unit, continues to output a storage flag to the output generator 105 to indicate that the data is being stored. In other words, the output generator 105 has a register including a value of the storage flag. It is described herein that each configuration has a register, however the present exemplary embodiment may include a configuration such that a value of the register can be referred to.

Figure 6:
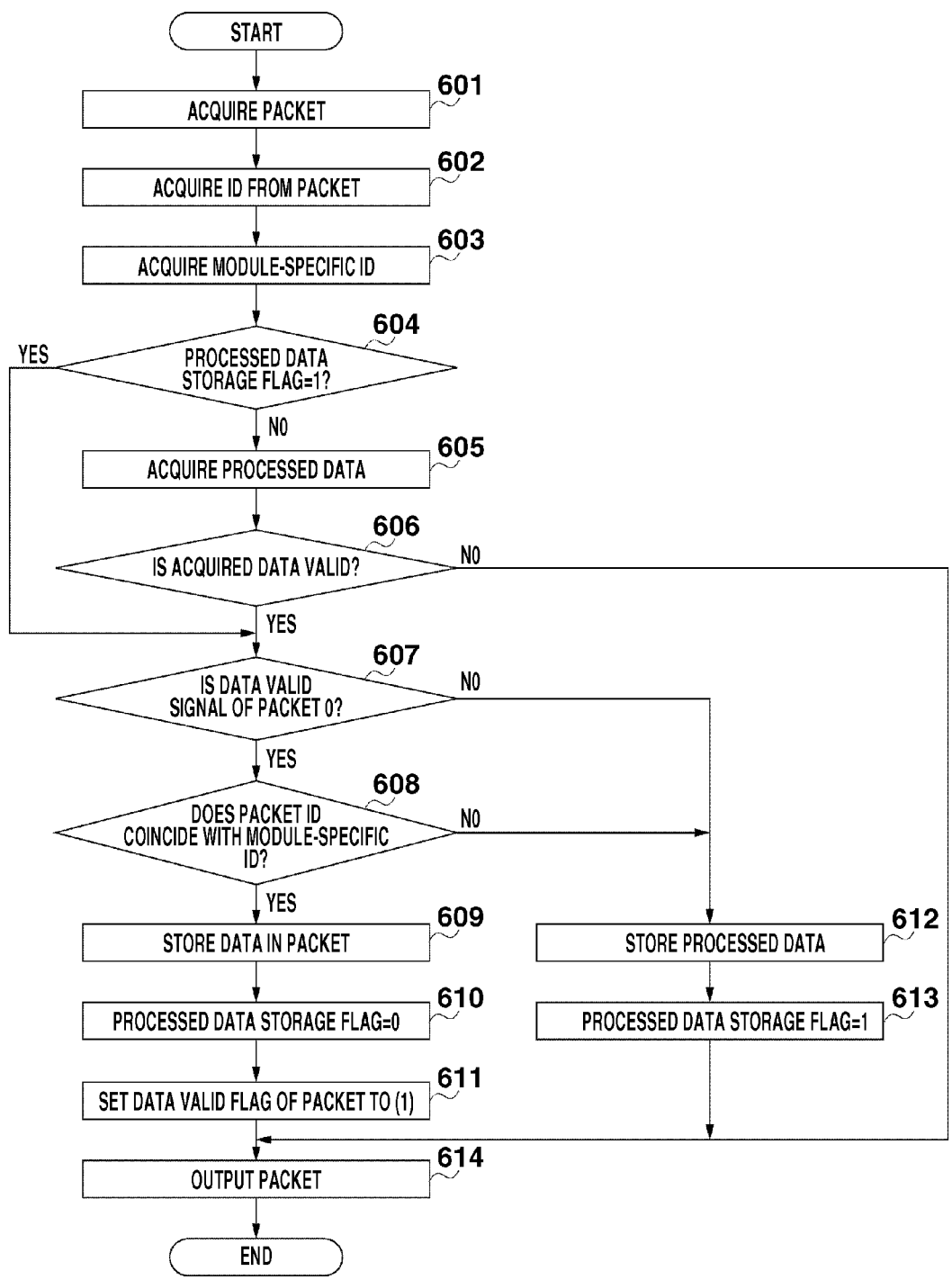
FIG. 6 illustrates processing of an output generator.

FIG. 6 illustrates processing performed by the output generator 105.

In step 601, the output generator 105 acquires a packet from the ring bus via the input data reception unit 101 and the input data identification unit 102. In step 602, the output generator 105 acquires an ID from the packet. In step 603, the output generator 105 acquires the specific ID set in own-module.

In step 604, the output generator 105 checks a storage flag. If the flag is 1 (YES in step 604), the output generator 105 executes the processing in step 607. On the other hand, if the flag is 0 (NO in step 604), the output generator 105 executes the processing in step 605.

In step 605, the output generator 105 acquires processed data from the data processing unit. In step 606, the output generator 105 checks whether valid processed data has been acquired from the data processing unit. If the valid processed data has been acquired (YES in step 606), the output generator 105 executes the processing in step 607. If the valid processed data has not been acquired (NO in step 606), the output generator 105 executes the processing in step 614.

In step 607, the output generator 105 checks whether a data valid signal of the packet acquired by the output generator 105 falls (in the present exemplary embodiment, signal falls in case of "0"). Then, if the signal has fallen (YES in step 607), then in step 608, the output generator 105 checks whether a packet ID (transmission source ID) coincides with the specific ID set in the processing unit.

If the packet ID coincides with the specific ID set in the processing unit (YES in step 608), the output generator 105 stores the processed data in a data storage region of the packet. Further, in step 610, the output generator 105 clears the storage flag to 0. In step 611, the output generator 105 sets a data valid signal of the packet that has stored the data to (1).

On the other hand, in step 607, if a valid bit is (1) (NO in step 607), or in step 608, the packet ID does not coincide with the specific ID of the processing unit (NO in step 608), then in step 612, the output generator 105 temporarily stores the data acquired from the processed data input unit. In step 612, the output generator 105 stores the processed data in the register or the like. In step 613, the output generator 105 sets the storage flag to 1. In step 614, the output generator 105 outputs the packet and stores it in the register or the like.

As described above, in the present exemplary embodiment, conceptually, each of the packets flowing around the ring bus is taken as a dedicated packet for one of a plurality of the data processing units, and at least one dedicated packet is allocated to each of the processing units used for the data processing. Therefore, in the present exemplary embodiment, the ID stored in the packet will never be changed by the processing unit. As a result, there can be avoided a deadlock resulting from the bus being filled with the packets that the same processing units have output.

If a dedicated packet is provided for at least one data processing unit (module), a risk that the relevant data processing unit may be filled with the packets of other data processing units will be eliminated. In a case where a plurality of modules perform pipeline processing in sequential order, if a dedicated packet is provided to a module in a subsequent stage in processing sequence than a module that outputs more packets than the number of packets to be input, the possibility of occurrence of deadlock due to fill-up with packets will be reduced.

Further, the control processing unit 501 arranges the packets having the same ID not to be adjacent to each other as illustrated in FIG. 7. Accordingly, bias of the packets flowing around the ring bus will be reduced, and data will be efficiently processed.

When the packets having the same ID are locally continued, for example, each processing unit cannot output processed data while the packets having IDs different from the specific ID that own-unit stores, are continued, so that the processing may not be efficiently performed from time to time. Thus, when the control processing unit 501 executes mapping of the packets, the mapping may be performed based on parameters of the arrangement interval. For example, when [arrangement interval=1] is set, at least a packet having a different ID will be mapped between packets having the same ID.

However, if two or more packets are necessary to be input to at least one of the data processing units for start processing (for example, reduction processing), only the packet having the specific ID of the relevant processing unit may be consecutively arranged by necessary number of packets for processing.

In the above described exemplary embodiment, if an ID of a packet acquired from the ring bus does not coincide with the specific ID of the processing unit, the output generator 105 does not store the processed data in the packet. Next, an exemplary embodiment in which, even if the packet ID does not coincide with the specific ID, if a data valid signal indicates invalid, the processed data may be stored in the packet, will be described below. In the descriptions hereinbelow, even if an ID of the packet acquired from the ring bus is different from the specific ID, the packet that has stored data is referred to as a borrowed packet. Further, the borrowed packet is released when a data processing unit of a borrow-source stores again an ID before borrowed.

In the present exemplary embodiment, one bit is allocated to a region for storing a borrowed flag separately from the ID in the field 204. In this process, if a flag is 1, it indicates a borrowed packet, and if a flag is 0, it indicates not a borrowed packet. Further, in order to add the ID before borrowed to the borrowed packet, a specific ID for packet for identifying each packet (hereinafter, referred to as a unified ID) is added. A unified ID is assumed to be a specific identifier for each packet.

Next, processing of each configuration in FIG. 1 in the present exemplary embodiment will be described below.

The output generator 105 stores data and its own specific ID, if a number of packets currently borrowed does not exceed a predetermined number, even if an ID of empty packet acquired from the input data identification unit is different from the specific ID. The output generator 105 has a counter (borrowing counter) for counting the number of borrowed packets. Further, when an empty packet is borrowed, the output generator 105 stores an original ID of the packet to be borrowed and the specific ID of the processing unit that has borrowed the packet in a borrowing table as illustrated in FIG. 10.

Figure 8:
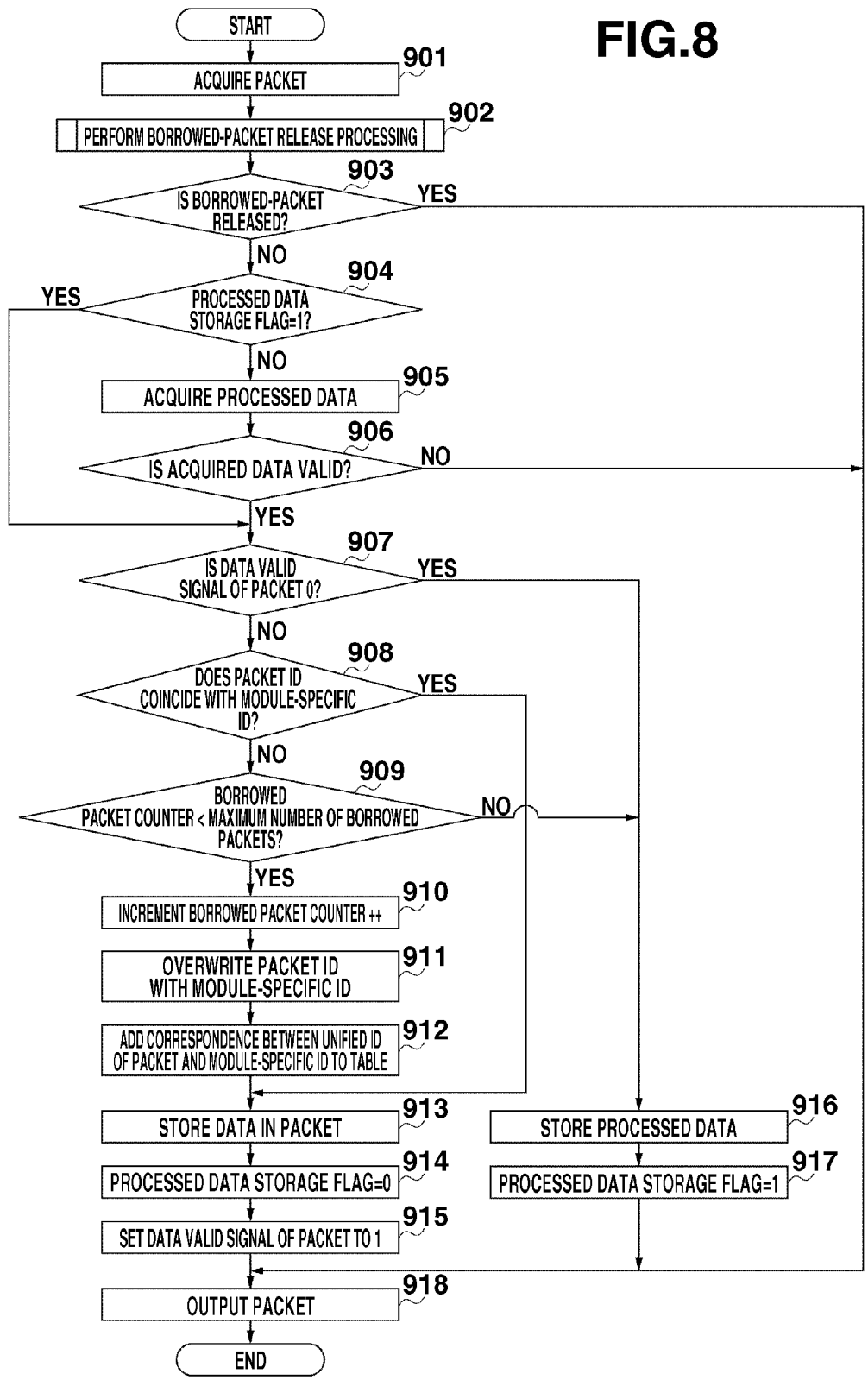
FIG. 8 illustrates processing of the output generator.

FIG. 8 is a flowchart of processing performed by the output generator 105 in the present exemplary embodiment. Steps 901, 904 to 908, and 913 to 918 are similar processing to those of steps 601, 604 to 608, and 609 to 614 in FIG. 6, respectively, therefore descriptions thereof will be omitted.

In step 902, the output generator 105 performs borrowed packet release processing. (Details will be described below).

In step 903, the output generator 105 determines whether a borrowed packet has been released in step 902. If the borrowed packet has been released (YES in step 903), the output generator 105 executes the processing in step 918. If the borrowed packet has not been released (NO in step 903), the output generator 105 executes the processing in step 904.

In step 909, the output generator 105 checks whether a value of a borrowed packet counter is smaller than a set value (maximum number of borrowed packets). If the value of the borrowed packet counter is smaller than the maximum number of the borrowed packets (YES in step 909), then in step 910, the output generator 105 increments the borrowed packet counter by 1. In step 911, the output generator 105 overwrites a packet ID with the specific ID of its own processing unit. In step 912, the output generator 105 stores correspondence between the unified IDs and the specific IDs in the table.

Figure 9:
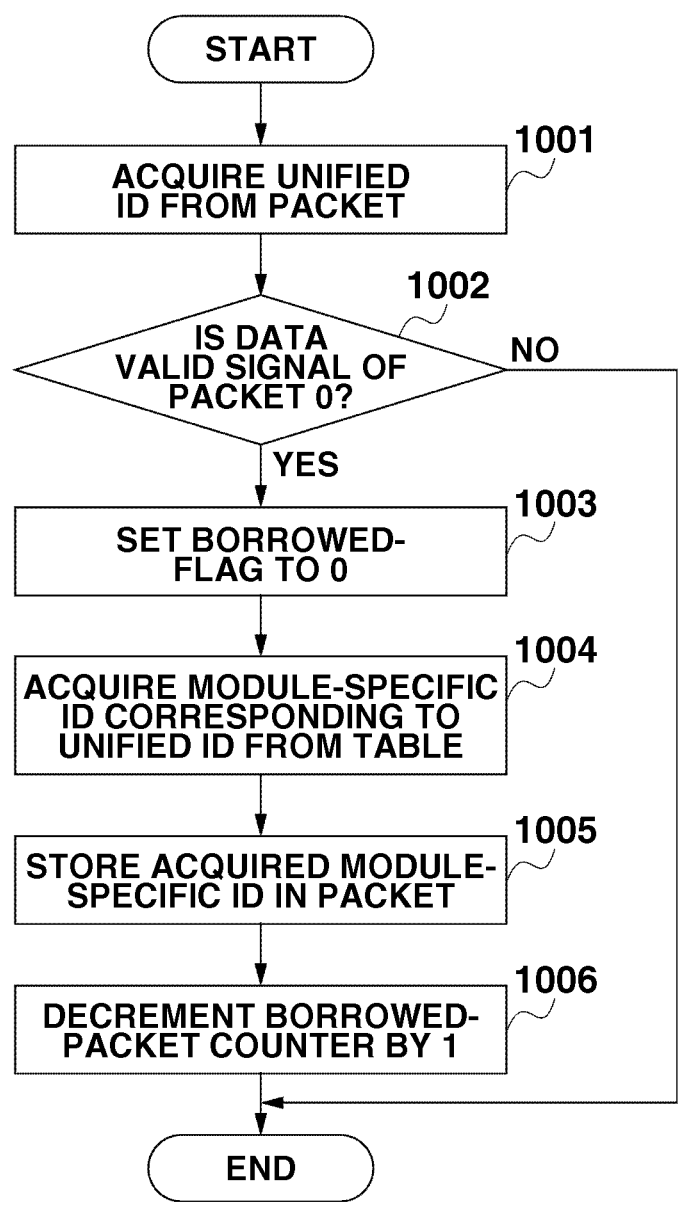
FIG. 9 illustrates packet release processing.

Next, a flowchart regarding the borrowed packet release processing in step 902 is illustrated in FIG. 9. It will be described below. In step 1001, the output generator 105 acquires the unified ID from a packet. In step 1002, the output generator 105 checks a data valid signal of the packet. If the data valid signal is 0 (YES in step 1002), the output generator 105 executes the processing in step 1003. If the data valid signal is 1 (NO in step 1002), the output generator 105 terminates the processing.

In step 1003, the output generator 105 sets the borrowed flag to 0. In step 1004, the output generator 105 acquires an ID of a packet before borrowing from the table. In step 1005, the output generator 105 sets again the acquired ID as the packet ID. In step 1006, the output generator 105 decrements the borrowed packet counter by 1.

As described above, even if the ID of the received empty packet is different from the specific ID, data processing can be performed more efficiently by temporarily borrowing the packet.

The similar effect can be produced only using a borrowed flag without using the unified ID. In this case, the output generator 105, upon receiving a packet with the borrowed flag being 1, performs the release processing based on the table. In this process, if information indicating relationship of the number of borrowing source IDs and borrowed destination IDs are stored in the table, a borrowed packet can be released according to the information.

Next, an exemplary embodiment in which a shared packet available in any data processing unit is arranged will be described below.

In the present exemplary embodiment, the output generator 105 stores processing data in the packet even if a packet ID is not yet set or information indicating sharing is added to a packet, in addition to the above-described cases.

The output generator 105 according to the present exemplary embodiment has a register (hereinafter referred to as a data interval storage unit 1205) that can store or refer to a setting value for arranging packets having the same specific IDs at a predetermined control interval or more. The data interval storage unit 1205 may store a setting value indicating a limit interval for each of IDs. The register 815 may be used as the data interval storage unit 1205.

In the present exemplary embodiment, a first bit in the highest order of the packet ID 204 is assigned to a shared flag. If this flag is 1, it indicates sharing, and if 0, it indicates otherwise. A region dedicated to the shared flag may be separately provided.

On the other hand, if it is assumed that data valid signal being set to 0 indicates its own occupancy, a borrowed flag at the second bit at the highest order is set to 1, and otherwise it is assumed to be set to 0. Similarly, a region for identifying borrowing may be provided in the packet. Such a packet is referred to as hereinafter a borrowed packet. In the present exemplary embodiment, if a packet ID is 0, the ID is assumed not to be yet set.

The output generator 105 can transmit packets to which its own specific ID is added at an interval of at least a value or larger than that is stored in the data interval storage unit 1205. Further, ON/OFF controls of transmission operation can be performed according to instructions.

Figure 11:
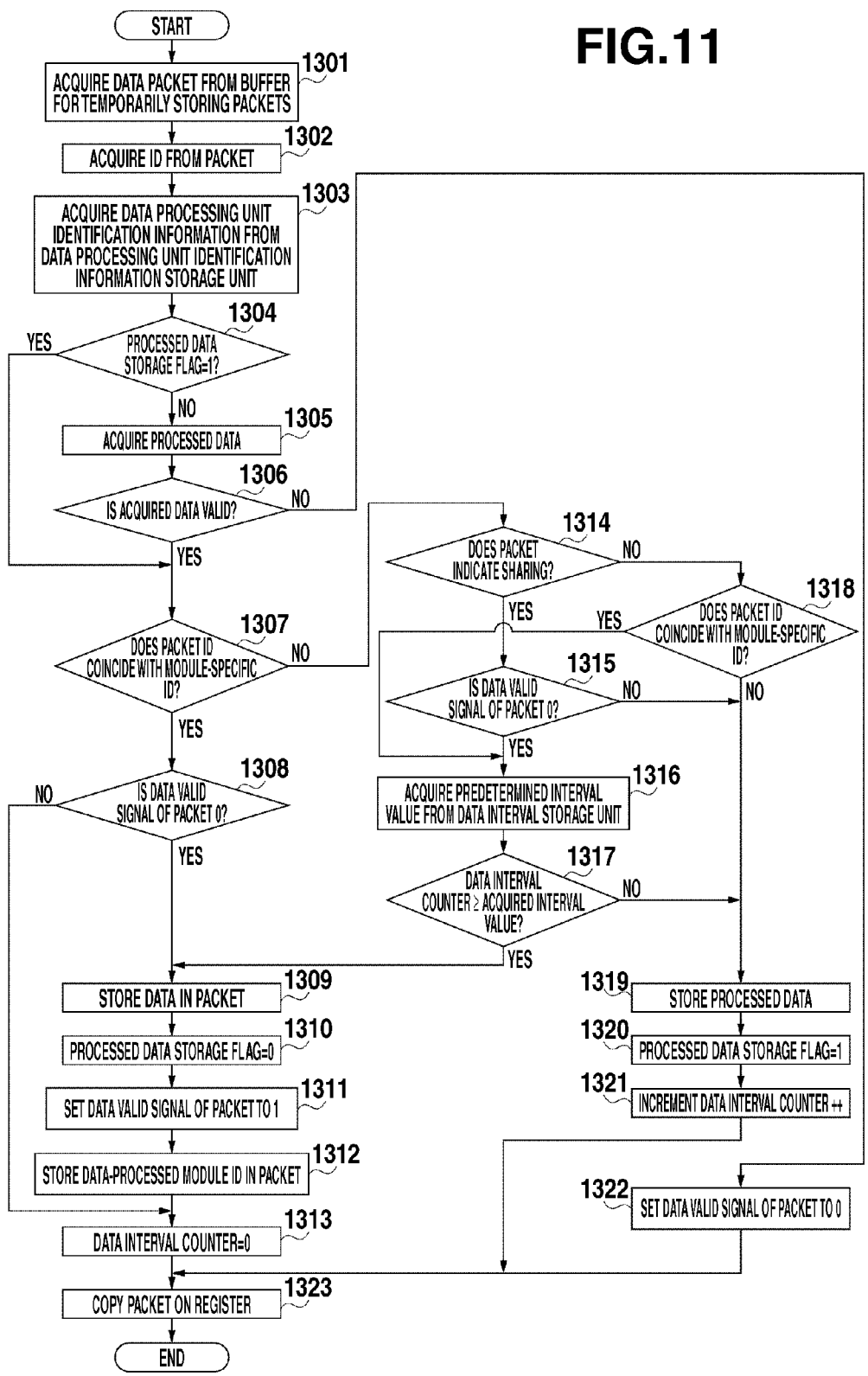
FIG. 11 illustrates processing of the output generator.

FIG. 11 illustrates a processing of the output generator 105 in the present exemplary embodiment. In step 1301, the output generator 105 acquires a packet from a buffer for temporarily storing packets. In step 1302, the output generator 105 acquires the ID from the packet. In step 1303, the output generator 105 acquires specific ID by referring to the register that stores its own specific ID.

In step 1304, the output generator 105 checks the storage flag. If the storage flag is 0 (NO in step 1304), the processing shifts to step 1305, and if the storage flag is 1 (YES in step 1304), the processing shifts to step 1307.

In step 1305, the output generator 105 acquires processed data from the data processing unit. In step 1306, the output generator 105 checks whether valid processed data has been acquired from the data processing unit. If the valid processed data has been acquired (YES in step 1306), the processing shifts to step 1307. If not acquired (NO in step 1306), the processing shifts to step 1323.

In step 1307, the output generator 105 compares the ID acquired from the packet with the specific ID. If these IDs coincide with each other (YES in step 1307), the output generator 105 executes the processing in step 1308. If they do not coincide with each other (NO in step 1307), the output generator 105 executes the processing in step 1314.

In step 1308, the output generator 105 checks whether a data valid signal of the packet is 0. If the data valid signal of the packet is 0 (YES in step 1308), the output generator 105 executes the processing in step 1309. If the data valid signal of the packet is 1 (NO in step 1308), the output generator 105 executes the processing in step 1313.

In step 1309, the output generator 105 stores the processed data in the packet. In step 1310, the output generator 105 sets the storage flag to 0. In step 1311, the output generator 105 sets the data valid signal of the packet to 1.

In step 1312, the output generator 105 stores the specific ID as the packet ID. If the packet ID is equal to the specific ID in step 1307, the processing in step 1312 may be omitted.

In step 1313, the output generator 105 resets a data interval counter to 0.

In step 1314, the output generator 105 checks whether the packet indicates sharing. If the packet indicates sharing (YES in step 1314), the output generator 105 executes the processing in step 1315. If the packet does not indicate sharing (NO in step 1314), the output generator 105 executes the processing in step 1318.

In step 1315, the output generator 105 checks whether the data valid signal of the packet is 0. If the valid signal is 0 (YES in step 1315), the output generator 105 executes the processing in step 1316. If the valid signal is 1 (NO in step 1315), the output generator 105 executes the processing in step 1319.

In step 1316, the output generator 105 acquires a predetermined interval value from the data interval storage unit. In step 1317, the output generator 105 compares the interval value acquired in step 1316 with the data interval counter. If the data interval counter is equal to or greater than the interval value (YES in step 1317), the output generator 105 executes the processing in step 1309. If otherwise (NO in step 1317), the output generator 105 executes the processing in step 1319.

In step 1318, the output generator 105 checks whether the packet ID is not yet set. If the packet ID is not yet set (YES in step 1318), the output generator 105 executes the processing in step 1316. If the packet ID is set (NO in step 1318), the output generator 105 executes the processing in step 1319.

In step 1319, the output generator 105 stores the processed data in the register. In step 1320, the output generator 105 sets the storage flag to 1. In step 1321, the output generator 105 increments the data interval counter by 1. In step 1322, the output generator 105 clears the data valid signal of the packet to 0.

In step 1323, the output generator 105 copies the packet to the register or the like.

The storage flag is assumed to be cleared to 0 when the data processing apparatus is initialized.

As described above, the data processing unit can perform data processing efficiently by occupying the packet in which identification information has not yet set and the shared packet, and arranging the packets at a certain interval.

In the above described exemplary embodiment, the mapping of packets is performed by the control processing unit 501. However, a packet control unit may be provided on the ring bus and perform allocation of the packets instead of the control processing unit 501. In this case, processing of storing IDs may be performed as described above for the packets passing through the control processing unit 501.

A schematic configuration diagram of each unit of the data processing apparatus used in the above described exemplary embodiments is used for purposes of illustrating connection relationship of circuits and functional units, so it is not intended to limit positional relationship of respective configurations. Further, an example of six communication units is used to simplify the description, however a plurality of the communication units and the processing units is enough for implementing the present invention.

Further, processing in the above-described exemplary embodiments may be realized by cooperation of a plurality of pieces of hardware and software. In this case, processing of the above-described exemplary embodiments can be realized by causing a processing apparatus (CPU, processor) such as a computer to execute software (program) acquired via a network or various types of storage media.

Further, the present invention may be realized by supplying a storage medium that stores a program for causing a computer to realize the above-described functions of each exemplary embodiment, to system or apparatus.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-094099 filed Apr. 8, 2009, which is hereby incorporated by reference herein in its entirety.

What is claimed is:

1. An apparatus including a plurality of modules, each module comprising:
   a storage unit configured to store a waiting ID and a specific ID of the module;
   a communication unit configured to transmit and receive packets to and from a ring bus; and
   a processing unit configured to process data of a valid packet which includes a flag having a first value indicating that the packet is valid among the received packets,
   wherein the communication unit takes in data held by a packet which has a packet ID that coincides with the waiting ID and transmit the packet, and stores the processed data in an empty packet which includes the flag having a second value indicating invalid and a packet ID coincident with the specific ID,
   wherein total number of valid and empty packets transmitting on the ring bus is about the same.

2. The apparatus according to claim 1, further comprising a setting unit configured to set the specific ID and the waiting ID for each of the modules, and to cause the plurality of the modules to execute pipeline processing in a predetermined sequential order.

3. The apparatus according to claim 2, wherein the setting unit arranges a packet which has the ID in the communication unit of each of the modules.

4. The apparatus according to claim 3, wherein the setting unit allocates each of the specific IDs of the modules to at least one packet.

5. The apparatus according to claim 3, wherein when each of specific IDs of the modules is allocated to a packet, the setting unit allocates the specific IDs in consideration of an interval at which the packets having the same ID are arranged.

6. The apparatus according to claim 1, wherein the communication unit sets a flag of a packet that has stored data to valid and transmits the packet to the bus.

7. The apparatus according to claim 1, wherein the communication unit sets a flag of a packet from which data is extracted to invalid and transmits the packet to the bus.

8. The apparatus according to claim 1, wherein when the flag is invalid, the communication unit stores and transmits the processed data up to a predetermined number of packets, even if a packets ID does not coincide with the specific ID.

9. The apparatus according to claim 1, wherein the packet includes a sharing flag indicating that a packet is shared by the plurality of the modules, and when the flag is invalid as to the packet which has the valid sharing flag, the communication unit stores and transmits the processed data in the packet even if the packet ID does not coincide with the specific ID.

10. The apparatus according to claim 1, wherein the storage unit is a register.

11. An apparatus including a plurality of modules, each module comprising:
a storage unit configured to store a specific ID of the module;
a communication unit configured to transmit and receive packets to and from a ring bus;
an identification unit configured to identify an ID and a flag having a first value indicating that a packet is valid; and
a processing unit configured to process data of the valid packet,
wherein the communication unit stores the processed data in an empty packet which has the flag having a second value indicating invalid and a packet ID coincident with the stored specific ID, and transmits the valid packet in a predetermined direction,
wherein total number of valid and empty packets transmitting on the ring bus is about the same.

12. The apparatus according to claim 11, further comprising a setting unit configured to set an ID to a packet, in the ring bus, wherein the setting unit sets an ID when a packet, to which an ID is not yet set, passes through.

13. The apparatus according to claim 11, further comprising a setting unit configured to set an ID to a packet, in the ring bus, wherein the setting unit sets an ID to a packet having the flag indicating invalid.

14. The apparatus according to claim 12, wherein the setting unit performs control so that an interval of packets which have the same ID to become equal to or greater than a control interval.

15. The apparatus according to claim 14, wherein the setting unit stores the control interval for each of the IDs, and performs control so that the interval of packets which have the same ID to become equal to or greater than the control interval according to the ID.

16. An information processing apparatus including a plurality of modules, each modules comprising:
a storage unit configured to store a specific ID of the module;
a communication unit configured to transmit and receive packets to and from a ring bus; and
a processing unit configured to process data of a packet which includes a flag having a first value indicating that a packet is valid,
wherein the communication unit stores the processed data in an empty packet, including the flag having a second value, of which a packet ID coincides with the stored specific ID and transmits the valid packet,
wherein total number of valid and empty packets transmitting on the ring bus is about the same.

17. A method for processing in an apparatus including a plurality of modules, the method comprising:
storing a specific ID of a module from the plurality of modules;
transmitting and receiving packets to and from a ring bus;
processing data of a packet which includes a flag having a first value indicating that the packet is valid; and
storing the processed data in an empty packet which includes the flag, having a second value, indicating invalid and a packet ID coincident with the specific ID, and transmitting the valid packet,
wherein total number of valid and empty packets transmitting on the ring bus is about the same.

18. A method for controlling an apparatus including a plurality of modules, the method comprising:
storing a specific ID of a module of the plurality of modules;
transmitting and receiving packets to and from a ring bus;
processing data of a packet which includes a flag having a first value indicating that the packet is valid; and
storing the processed data in an empty packet, including the flag having a second value of which a packet ID coincides with the stored specific ID and transmitting the valid packet,
wherein total number of valid and empty packets transmitting on the ring bus is about the same.

* * * * *